United States Patent [19]

Harris

[11] 4,015,652
[45] Apr. 5, 1977

[54] TIRE AND RIM ASSEMBLY

[75] Inventor: James T. Harris, Cuyahogo Falls, Ohio

[73] Assignee: The Goodyear Tire & Rubber Company, Akron, Ohio

[22] Filed: Nov. 12, 1975

[21] Appl. No.: 630,980

[52] U.S. Cl. .................. 152/379.1; 152/330 L; 152/330 RF; 152/362 R; 152/381.2
[51] Int. Cl.² .................. B60C 15/02; B60C 17/00
[58] Field of Search ..... 152/330 RF, 330 L, 362 R, 152/362 CS, 399, 400, 158, 381 R, 381 A

[56] References Cited

UNITED STATES PATENTS

| 2,399,572 | 4/1946 | Powell et al. | 152/400 |
| 3,426,821 | 2/1969 | Boileau | 152/158 |
| 3,857,427 | 12/1974 | Soucek | 152/330 RF |
| 3,938,573 | 2/1976 | Hallenbeck | 152/330 RF |

FOREIGN PATENTS OR APPLICATIONS 1,133,648    7/1962    Germany .................. 152/379 R Primary Examiner—Drayton E. Hoffman
Attorney, Agent, or Firm—F. W. Brunner; P. E. Milliken; Frederick K. Lacher

[57] ABSTRACT

A tire and rim assembly for retaining a deflated tire on a rim in which a pair of bead portions are mounted in bead seats at the edges of the rim. At least one of the bead portions is adhered to the rim at one of the bead seats with a cement having sufficient bonding strength to retain the bead portion on the rim during operation of the tire in the deflated condition. The adhesive bond may be broken without damage to the bead portions of the tire to dismount the tire from the rim after the vehicle is stopped.

4 Claims, 5 Drawing Figures

U.S. Patent     April 5, 1977     4,015,652
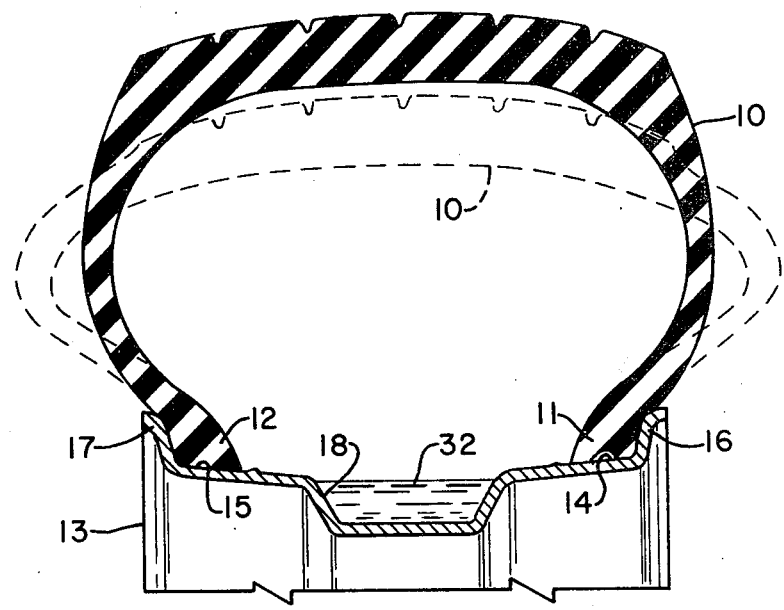
FIG-1
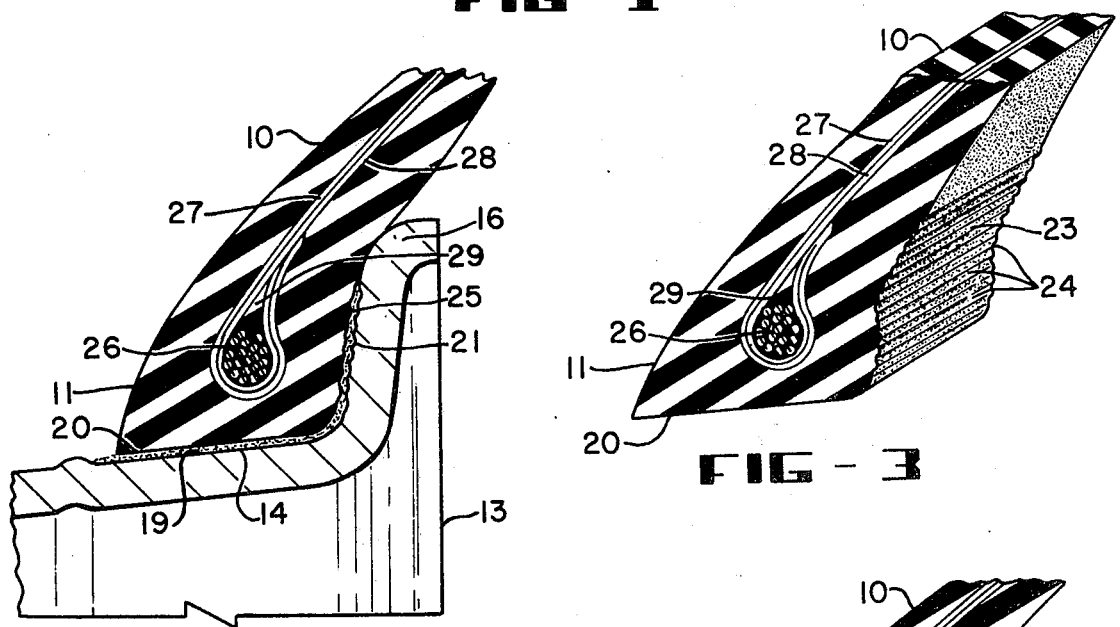
FIG-2
FIG-3
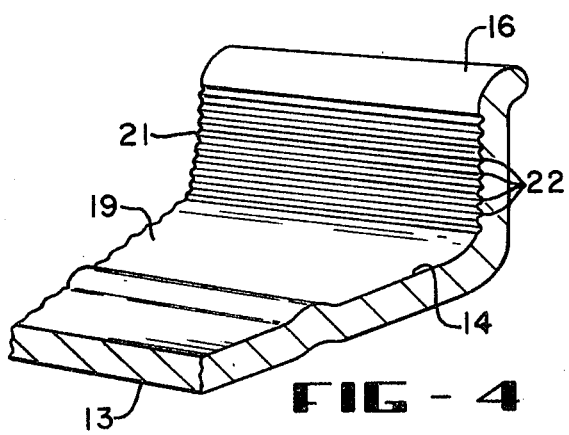
FIG-4
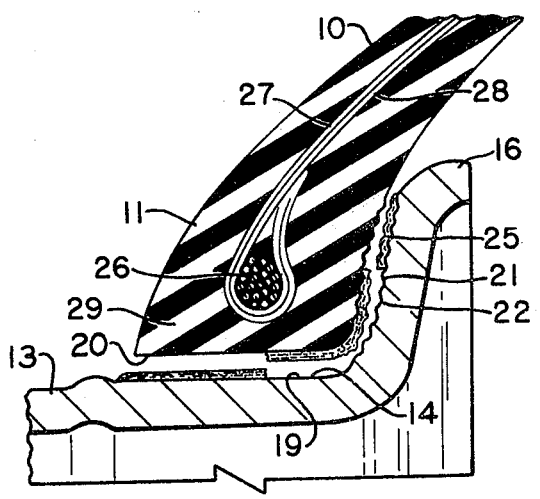
FIG-5

TIRE AND RIM ASSEMBLY

This invention relates generally, as indicated, to a tire and rim assembly in which the tire is retained on the rim in the deflated condition during rotation in a loaded condition as on a vehicle.

Heretofore different types of bead retainers have been proposed for holding a tire bead on a bead seat of a rim. One of the problems with these bead retainers has been the installation of the retainers within the tire during and after mounting of the tire on the rim. Another problem has been the removal of the retainers after deflation of the tire and before removal of the tire from the rim. Problems have also been had with the harsh ride characteristics of the tire held on the rim by retainers during operation in the deflated condition.

With the foregoing in mind, it is the principal object of this invention to provide for fastening one bead of a tire to the rim at one bead seat to retain the bead during operation of the tire in the deflated condition.

Another object is to provide for releasing the bead from the rim without damaging the tire.

A further object is to provide for fastening one bead to the rim while permitting the other bead to move relative to the rim during operation of the tire in the deflated condition.

A still further object is to provide a tire and rim assembly with a lubricant to lubricate and cool the tire during operation in the deflated condition.

Another object is to provide an adhesive for cementing the tire bead portion to the rim at the bead seat to retain the bead portion on the rim during operation of the tire in the deflated condition and permit removal of the tire from the rim without damaging the tire.

A further object is to provide uneven bead portion and rim flange surfaces for application of the adhesive.

These and other objects of this invention are provided by cementing one of the beads to the rim at a bead seat with an adhesive having sufficient bonding strength to hold the bead during operation of the tire in the deflated condition and permit detachment of the bead from the rim without damage to the tire upon removal of the tire from the rim.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the annexed drawings:

FIG. 1 is a fragmentary cross-sectional view in perspective of a tire and rim assembly embodying the invention showing the tire in chain-dotted lines in the deflated condition.

FIG. 2 is an enlarged fragmentary sectional view in perspective of a bead portion of the tire and the corresponding bead seat and flange of the rim shown in FIG. 1.

FIG. 3 is an enlarged fragmentary sectional view in perspective of the bead portion of the tire shown in FIG. 2.

FIG. 4 is an enlarged fragmentary sectional view in perspective of the bead seat and flange of the rim showing the rim flange surface abutting the tire bead portion.

FIG. 5 is a fragmentary cross-sectional view of the tire bead portion and rim after the bead portion has been detached from the rim flange.

Referring to FIG. 1, an annular tire 10 is shown having a U-shaped cross section with a first bead portion 11 at one edge and a second bead portion 12 at the other edge. The tire 10 is of the so-called "tubeless" pneumatic type and is adapted for mounting on a standard rim 13.

A first bead seat 14 is provided at one side of the rim 13 for mounting of the first bead portion 11 of the tire 10 and a second bead seat 15 is provided at the other side of the rim for mounting of the second bead portion 12. The first bead seat 14 and the second bead seat 15 are tapered for improved seating or press fit of the first bead portion 11 and second bead portion 12, respectively. In this embodiment the taper is 5° relative to a cylindrical surface of revolution about the axis of the wheel on which the rim 13 is mounted. Rim flanges 16 and 17 extend radially outward from the rim 13 at the first bead seat 14 and second bead seat 15, respectively.

The rim 13 may have a drop center configuration with a well 18 extending circumferentially of the rim to facilitate mounting of the tires and pulling of the bead portions 11 and 12 over the rim flange 17.

As shown more clearly in FIGS. 2, 3 and 4, the first bead seat 14 of the rim 13 has a tire-engaging surface 19 for engagement with a surface 20 of the first bead portion 11 of the tire 10. The inner face of the rim flange 16 may have an uneven tire-engaging surface 21 provided by grooves 22 in the surface. The first bead portion 11 may also have an uneven surface 23 extending radially outward of the tire 10 with grooves 24 for engagement with the surface 21 of the rim flange 16.

To adhere the first bead portion 11 of the rim 13, the metal bead seat surface 19 and flange surface 21 are first cleaned by wiping with a suitable cleaning solution such as trichloroethane. Then a thin coat of primer such as Bostik 1007 made by the United States Shoe Machinery Company is applied with a bristle brush and allowed to dry for approximately one hour. The faying surfaces 20 and 23 of the first bead portion are buffed with fine sandpaper of grade 320 or finer or by scrubbing with a stiff bristle fiber brush. The surfaces 20 and 23 are then wiped clean with a cloth soaked with a cleaning solution such as trichloroethane.

The tire 10 is then mounted on the rim 13 with conventional mounting equipment. The mounting mandrel should be clean and no lubricant applied to the surfaces 20 and 23 of the first bead portion 11 or the surfaces of the second bead portion 12. If necessary, a small amount of cleaning solution may be applied at the mandrel to avoid damaging the surfaces 20 and 23 of the first bead portion 11 or the surfaces of the second bead portion 12.

After inserting the bead portions 11 and 12 into the wheel well 18, one heavy coat of an adhesive such as a mixed cement 25 is applied to the surfaces 19 and 21 of the rim 13 as by a brush and the first bead portion and second bead portion seated. The cement 25 is allowed to dry and cure 48 hours at 40 p.s.i. before operating the tire in a deflated condition.

The cement 25 is a mixture of an acceleration solution No. 1467c made by The Goodyear Tire & Rubber Company and a cement compound No. 1497c made by The Goodyear Tire & Rubber Company. One part of the acceleration solution is mixed with twenty parts of cement compound and then applied to the rim 13.

As shown in FIGS. 2, 3 and 5, the first bead portion 11 of the tire 10 has a wire bead 26 and reinforcing plies 27 and 28 of fabric or other suitable material extending around the bead 26 and embedded in a bead covering material 29 of rubber or other rubberlike substance which has been vulcanized to provide a unitary structure in the first bead portion. The bead covering material 29 in the surface 23 of the first bead portion 11 which is adhered to the surface 29 of the rim flange 16 is adhered to the plies 27 and 28 and the bead 26 by a holding force which exceeds the bonding strength of the adhesive material 25 holding the first bead portion in the first bead seat 14. Accordingly, after the surface 23 of the first bead portion 11 and the surface 21 of the rim flange 16 have been cemented together by the adhesive material 25, the first bead seat 14 may be detached from the rim 13 by exerting a force F, as shown in FIG. 5, which is greater than the strength of the bond between the first bead portion 11 and the rim 13 causing the bond to break but without pulling the bead covering surface 23 away from the first bead portion.

As shown in FIG. 1, a lubricant 32 such as water containing glycol or other suitable lubricating and cooling fluid may be carried in the tire cavity for lubricating and cooling of the tire 10.

The rim 13 is mounted on a wheel (not shown) which in turn is mounted on the shaft or axle of a vehicle. Preferably, the first bead portion 11 and first bead seat 14 are on the inboard side of the wheel facing the vehicle. The second bead portion 12 and second bead seat 15 are on the outboard side of the wheel facing away from the vehicle.

After the tire 10 is mounted on the rim 13, the valve may be opened to release the air pressure from the tire cavity and the lubricant 32 injected through the valve. Thereafter, the tire 10 may be inflated to normal operating pressure through the valve.

With a tire pressure of 24 p.s.i., it has been found that the load required to unseat the first bead portion 11 cemented to the rim 13 was around sixteen percent greater than the load required to unseat the second bead portion 12 which is not cemented. This test was made with an HR78-15 tire which had been cemented to a 15×6 wheel. The bead seat area of a new wheel was primed with a primer (Bostic 1007) and coated with one coat of Goodyear Tire & Rubber Company 1497c neoprene cement. The HR78-15 Custom Tread tire was buffed on both beads prior to installation on the wheel. The bead unseating operation was performed on two locations 180 degrees apart on the outboard bead. The unseating loads were 4,080 pounds and 3,970 pounds. An identical tire construction without the adhesive connection was tested as a control and had unseating loads of 3,670 pounds and 3,260 pounds. The Department of Transportation minimum unseating load for this tire is 2,500 pounds. The testing was conducted according to the specifications for a Department of Transportation bead unseat test.

When the tire 10 is deflated and run in the deflated condition, the tire is deformed into the general configuration shown in chain-dotted lines in FIG. 1. Test results from operating the tire 10 and rim 13 embodying this invention in the deflated or runflat condition indicate that both bead portions 11 and 12 remain seated and the ride provided was smooth. It was also found that where a bead portion was unseated, it was the second bead portion 12 located at the outboard side of the wheel where a minimum of damage and detriment to control of the vehicle is experienced.

To remove the tire 10 from the rim 13, the tire is deflated by opening the valve and the second bead portion 12 pulled into the well 18 after which it may be pulled over the rim flange 17. The first bead portion 11 is then placed in a tire dismounting machine where the rim 13 is held in place and the sidewall of the tire containing the surface 23 of the first bead portion 11 is pushed away from the rim flange 16 by a force F greater than the bonding strength of the cement 25. This results in the pulling away of the first bead portion 11, as shown in FIG. 5, without damage to the tire 10. The remaining patches of cement 25 adhered to the first tire bead portion 11 and rim 13 can then be buffed off the surfaces 19, 20, 21 and 22 whereupon they are ready for mounting of the tire 10 again.

While a certain representative embodiment has been shown for the purpose of illustrating the invention, it will be apparent to those skilled in the art that various changes and other modifications may be made therein without departing from the invention.

What is claimed is:

1. A tire and rim assembly comprising a rim for a wheel, said rim having a generally cylindrical shape and a pair of radially outwardly extending rim flanges at the edges, a first bead seat on said rim adjacent one of said rim flanges, a second bead seat on said rim adjacent the other of said flanges, an annular tire having a U-shaped cross section with circumferentially extending edges, a first bead portion at one of said edges and a second bead portion at the other of said edges, said first bead portion being mounted on said first bead seat and including a first annular inextensible bead ring with reinforcing plies embedded in and adhered by a bond to a bead covering material, said second bead portion including a second annular inextensible bead ring with reinforcing plies embedded in and adhered by a bond to said bead covering material, said first bead portion being adhered to said rim at said first bead seat by a cement providing a bond with sufficient strength to retain said first bead portion in said first bead seat during operation of said tire in the deflated condition and said bond between said bead covering material and said first bead ring with reinforcing plies being stronger than said bond between said first bead portion and said rim at said first bead seat so that said first bead portion can be unseated from said first bead seat without breaking said bond between said bead covering material and said first bead ring and reinforcing plies during dismounting of said tire from said rim.

2. A tire and rim assembly according to claim 1 wherein said tire and said rim support a vehicle on which said wheel is mounted, said first bead seat and said first bead portion are on the inboard side of said wheel facing towards the vehicle and said second bead portion is mounted on said second bead seat of said rim at the outboard side of said wheel with a nonadhesive press fit.

3. A tire and rim assembly according to claim 1 wherein said first bead portion has an annular, axially extending surface for adherence to the surface of said first bead seat and an annular, radially extending surface for adherence to the surface of one of said rim flanges adjacent said first bead seat.

4. A tire and rim assembly according to claim 3 wherein said annular, radially extending surface of said first bead portion and said surface of said rim flange are uneven to increase the adherence of said first bead portion of said rim.

* * * * *